US007240220B2

(12) United States Patent
Osaki

(10) Patent No.: US 7,240,220 B2
(45) Date of Patent: Jul. 3, 2007

(54) METHOD AND APPARATUS FOR CRYPTOGRAPHIC CONVERSION IN A DATA STORAGE SYSTEM

(75) Inventor: Nobuyuki Osaki, Campbell, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/228,441

(22) Filed: Sep. 15, 2005

(65) Prior Publication Data

US 2006/0064604 A1 Mar. 23, 2006

Related U.S. Application Data

(63) Continuation of application No. 10/799,086, filed on Mar. 11, 2004, now Pat. No. 7,162,647.

(51) Int. Cl.
 *H04L 9/00* (2006.01)
(52) U.S. Cl. .................... 713/193; 726/2; 713/191
(58) Field of Classification Search .............. 713/1, 713/2, 188, 194, 191, 193; 380/200, 201, 380/255, 277; 726/2
See application file for complete search history.

(56) References Cited

U.S. PATENT DOCUMENTS

| | | | |
|---|---|---|---|
| 5,208,813 A | 5/1993 | Stallmo | |
| 5,235,641 A | 8/1993 | Nozawa et al. | |
| 5,548,648 A | 8/1996 | Yorke-Smith | |
| 5,677,952 A | 10/1997 | Blakely et al. | |
| 5,742,686 A | 4/1998 | Finley | |
| 5,940,507 A | 8/1999 | Cane et al. | |
| 5,987,572 A | 11/1999 | Weidner et al. | |
| 6,359,621 B1 * | 3/2002 | Maeda et al. | ............... 345/473 |
| 6,570,989 B1 | 5/2003 | Ohmori et al. | |
| 2001/0023484 A1 | 9/2001 | Ichimura | |
| 2003/0043905 A1 * | 3/2003 | Nakayama et al. | ..... 375/240.04 |
| 2003/0126451 A1 | 7/2003 | Gorobets | |
| 2003/0188178 A1 | 10/2003 | Strongin et al. | |
| 2004/0105501 A1 * | 6/2004 | Maeda | .................. 375/240.26 |
| 2004/0125077 A1 | 7/2004 | Ashton | |
| 2004/0128258 A1 * | 7/2004 | Su | ............................. 705/67 |
| 2004/0250097 A1 | 12/2004 | Cheung et al. | |
| 2005/0021986 A1 | 1/2005 | Graunke et al. | |
| 2005/0102498 A1 * | 5/2005 | Bojinov et al. | ............. 713/151 |

FOREIGN PATENT DOCUMENTS

WO WO02/093314 A1 11/2002

OTHER PUBLICATIONS

"Advanced Encryption Standard" Federal Information Processing Standards (FIPS) Publication 197 (2001).
"Data Encryption Standard (DES)" Federal Informaiton Processing Standards (FIPS) Publication 46-2 (1993).

* cited by examiner

*Primary Examiner*—Kim Vu
*Assistant Examiner*—Joseph Pan
(74) *Attorney, Agent, or Firm*—Townsend and Townsend and Crew LLP

(57) ABSTRACT

When data is encrypted and stored for a long time, encryption key(s) and/or algorithm(s) should be updated so as not to be compromised due to malicious attack. To that end, stored encrypted data is converted in the storage system with new set of cryptographic criteria. During this process, read and write requests can be serviced.

8 Claims, 7 Drawing Sheets

METHOD AND APPARATUS FOR CRYPTOGRAPHIC CONVERSION IN A DATA STORAGE SYSTEM

This application is a continuation of U.S. patent application Ser. No. 10/799,086, filed Mar. 11, 2004, now U.S. Pat. No. 7,162,647 the entire disclosure of which is incorporated herein by reference.

BACKGROUND OF THE INVENTION

The present invention is generally related to storage systems and in particular to a system and method for cryptographic storage technique to provide secure long term retention of data.

Storage systems have been evolving around network-based architectures. Notable architectures include network attached storage (NAS) systems and storage area network (SAN) systems. Network accessible storage allows an enterprise to decentralize its operations and to locate its users around the world. Long term storage becomes increasingly more significant as various aspects of an enterprise are reduced to data which can be accessed by its distributed users. In addition, government regulations require long term storage of certain types of information, such as electronic mail.

However, when storage systems are connected through networks, there is a security risk for unauthorized intrusion of the storage systems. Rogue servers or switches, and in general "hackers," can cause network disruption by their unauthorized access to data. Encrypting the data in flight and/or at rest will work to avoid these risks.

Encryption algorithms are susceptible to technology in that advances in data processing technology create increasingly more powerful computing systems that can be used to break contemporary encryption schemes. An encryption scheme (in general, the cryptographic criteria for encrypting and decrypting data) that is presently thought to be computationally inaccessible is likely to be cracked by the processors and cryptographic engines of a few years from now. One solution is to apply stronger encryption; e.g., use longer encryption key lengths, more advanced encryption algorithms, or both when such time arrives, thereby raising the computational hurdle.

However, this poses problems for encrypted data that is to be stored for long periods of time. First, there is the need to keep the data for a period of time. A time passed, the "older" encrypted data have weaker encryption in comparison to available processing power. Thus, encrypted data thought to be secured at one time is likely to be broken years later. There is a need for the encrypted data to be available. Consequently, the "older" encrypted data is susceptible to unauthorized access by someone with sufficient processing power. Therefore a need exists to provide of increasingly stronger cryptographic criteria, e.g., longer key(s), stronger algorithms, etc., for long term storage of encrypted data.

SUMMARY OF THE INVENTION

An aspect of the present invention includes converting data stored on a storage system from a first encryption to a second encryption. The first encryption is based on first cryptographic criteria. The second encryption is based on second cryptographic criteria. During the conversion process, I/O requests can be received and serviced.

Another aspect of the invention includes converting data stored on a storage system wherein the data is initially stored in un-encrypted form. The conversion includes encrypting the data. During the conversion process, I/O requests can be received and serviced.

BRIEF DESCRIPTION OF THE DRAWINGS

Aspects, advantages and novel features of the present invention will become apparent from the following description of the invention presented in conjunction with the accompanying drawings, wherein.

DESCRIPTION OF THE SPECIFIC EMBODIMENTS

For the following discussion, the term "criteria" used in the context of a discussion with cryptographic processes such as encryption and decryption will be understood to refer to families of cryptographic algorithms, specific cryptographic algorithms, a key or keys used with a specific cryptographic algorithm, and so on. Cryptographic criteria refers to the information, such as encryption/decryption key(s) and/or algorithm, that is applied to un-encrypted ("clear") data to produce encrypted data, and conversely to decrypt encrypted data to produce clear data.

Figure 1:
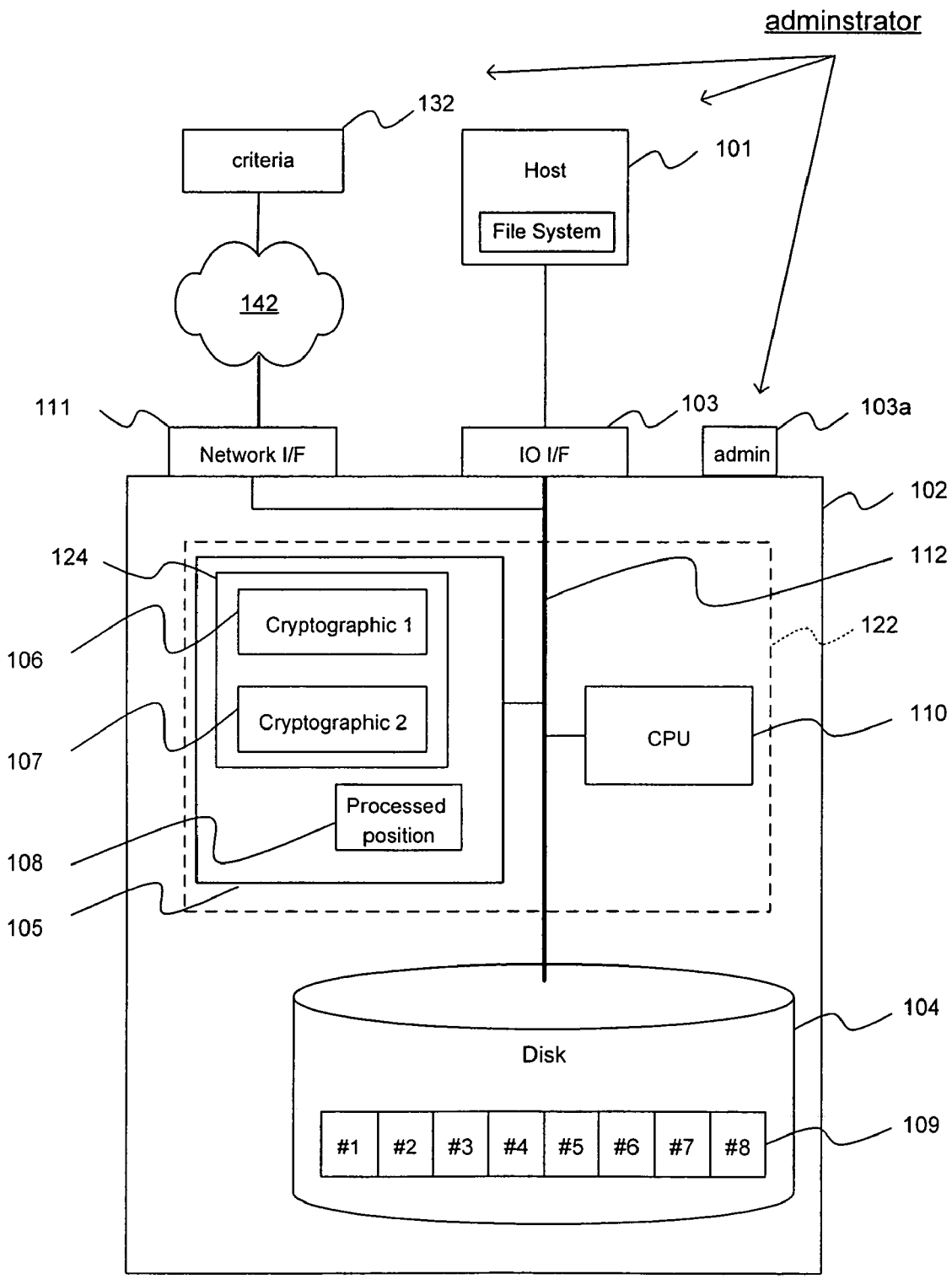
FIG. 1 is a generalized block diagram showing an illustrative embodiment of a storage system according to the present invention.

FIG. 1 shows an illustrative embodiment of a storage system 102 according to the present invention. A host device 101 is in data communication with the storage system 102 via an interface 103. It is understood, of course, that additional interfaces and host devices can be provided; FIG. 1 is simplified for discussion purposes. The host device 101 exchanges data with the storage system 102 by way making I/O requests, including read requests and write requests which are then serviced by the storage system. Data communication between the host device 101 and the storage system 102 is provided via the interface 103.

The storage system 102 includes a physical storage component 104. It can be appreciated that the physical storage component 104 can be any appropriate storage architecture. Typical architectures include RAID (redundant array of inexpensive disks) and JBOD (just a bunch of disks). For discussion purposes, the storage component 104 is characterized in that data is physically stored in data units 109 referred to variously as "blocks of data", "data blocks", and "blocks".

A processing unit 110 and a memory component 105 constitute a control component of the storage system to service I/O requests from the host device 101. It is understood that the processing unit 110 and the memory component 105 can be configured in any suitable arrangement. In a particular implementation, for example, the processing unit 110 and the memory 105 can be embodied in a controller device (shown in phantom lines, 122).

An internal bus 112 provides signal paths and data paths among the constituent components of the storage system 102. The internal bus 112 provides a connection between the interface 103 and the processor 110, for example. The internal bus 112 can provide an interface to the physical storage component 104 for data exchange.

The storage system 102 can be provided with a network interface 111 for communication over a communication network 142. The network interface 111 allows networked devices to access the storage system 102. As will be explained below, the network interface 111 allows for the storage system 102 to access a network (e.g., Internet, LAN, etc.) to obtain information.

The memory component 105 typically contains program code that is executed by the processing unit 110 to perform the various functions of the storage system 102. This includes servicing I/O requests from host devices (e.g., host device 101) and communicating over a network via the network interface 111. Consider a read request, for example. The processing to service a read request typically involves accessing one or more block locations on the physical storage component 104 to read out data (read data) from the accessed block location(s). The read data is then communicated to the requesting device. Similarly, a write request is typically serviced by writing one or more blocks associated with the write request to block locations on the physical storage device 104.

The memory component 105 further includes program code collectively referred to as a cryptographic component 124. In accordance with the embodiment of the invention shown in FIG. 1, the cryptographic component 124 comprises first cryptographic criteria 106 (or first cryptographic process) and second cryptographic criteria 107 (or second cryptographic process). The cryptographic criteria 106, 107 comprise program code to perform encryption and decryption operations. In accordance with an aspect of the present invention, the first cryptographic criteria 106 differ from the second cryptographic criteria 107 in that the encryption of original data using the first criteria will produce encrypted data that is different from encrypted data that is produced when the second criteria is applied to the original data. It is preferable that the cryptographic criteria that is used has the property that the encrypted data is the same size as the un-encrypted data. Thus, the encryption of a 256-byte block of data will produce a 256-byte block of encrypted data. This same-data-size property is not an aspect of the present invention. However, it will be appreciated that ensuring the same data size facilitates implementation of the present invention.

The cryptographic criteria 106, 107 can be provided to the storage system 102 from an external source. For example, a source 132 can be accessed over the communication network 142 by the storage system 102 to obtain the cryptographic criteria. In this way, the criteria can be provided by an administrator.

Figure 1A:
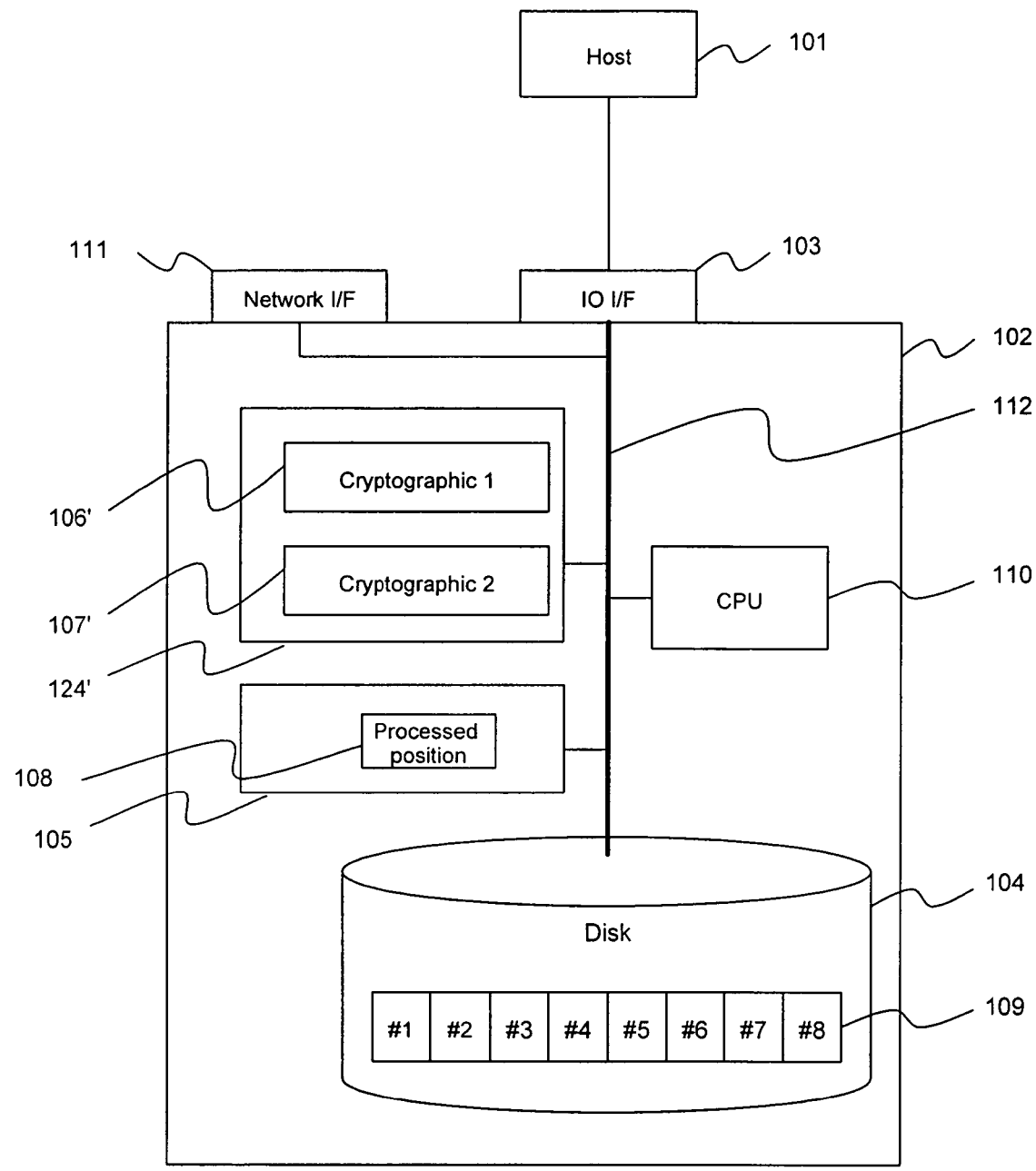
FIG. 1A shows an alternate embodiment of the storage system shown in FIG. 1.

FIG. 1A shows an alternative embodiment wherein a cryptographic component 124' comprises a hardware encryption engine to perform cryptographic operations. Encryption/decryption hardware is known and typically includes logic circuits customized for high-performance execution of encryption and decryption operations. The encryption engine 124' might include first logic 106' configured to provide encryption and decryption according first cryptographic criteria and second logic 107' configured to provide encryption and decryption according to second cryptographic criteria. Alternatively, the encryption engine 124' might comprise two encryption engines, one for the first cryptographic criteria and the other for the second cryptographic criteria. This would facilitate installing new cryptographic criteria as will be discussed below.

For a given environment, it may be preferable to use a hardware engine as compared to a software-based encryption and decryption approach. For example, the processing component 110 can become obsolete for the purpose of cryptographic processing as technology advances. This places a ceiling on the ultimate strength of a software-based cryptographic component. If new cryptographic processing is provided with pluggable physical devices, the tie to the processing component 110 can be severed because the pluggable physical devices can use the latest hardware technology. In the discussions to follow, it will be understood that the cryptographic capability can be provided by hardware, software, and combinations of hardware and software. The different cryptographic criteria will be identified by the reference numerals 106, 107.

According to the embodiment of the present invention shown in FIG. 1, data is initially stored on the physical storage device 104 in encrypted form. More specifically, when a host device writes un-encrypted data to the storage system 102 by way of write requests, that data is encrypted using the first cryptographic criteria 106. The resulting one or more blocks of encrypted data that are produced are then stored on the physical storage device 104. It is noted that the data that is sent from the host device can in fact be some form of encrypted data. For example, an application running on the host might produce encrypted output data to be stored on the storage system 102. Such data, however, is not considered "encrypted" until it is processed in the storage system 102 by the first cryptographic criteria 106.

When a read request is made by a host device, one or more blocks of data are read from the physical storage device. The blocks of data, being in encrypted form, are decrypted by applying the first cryptographic criteria to the blocks of data to produce decrypted data blocks. The requested data can then be read out of the decrypted data blocks and communicated back to the host device.

Figure 2:
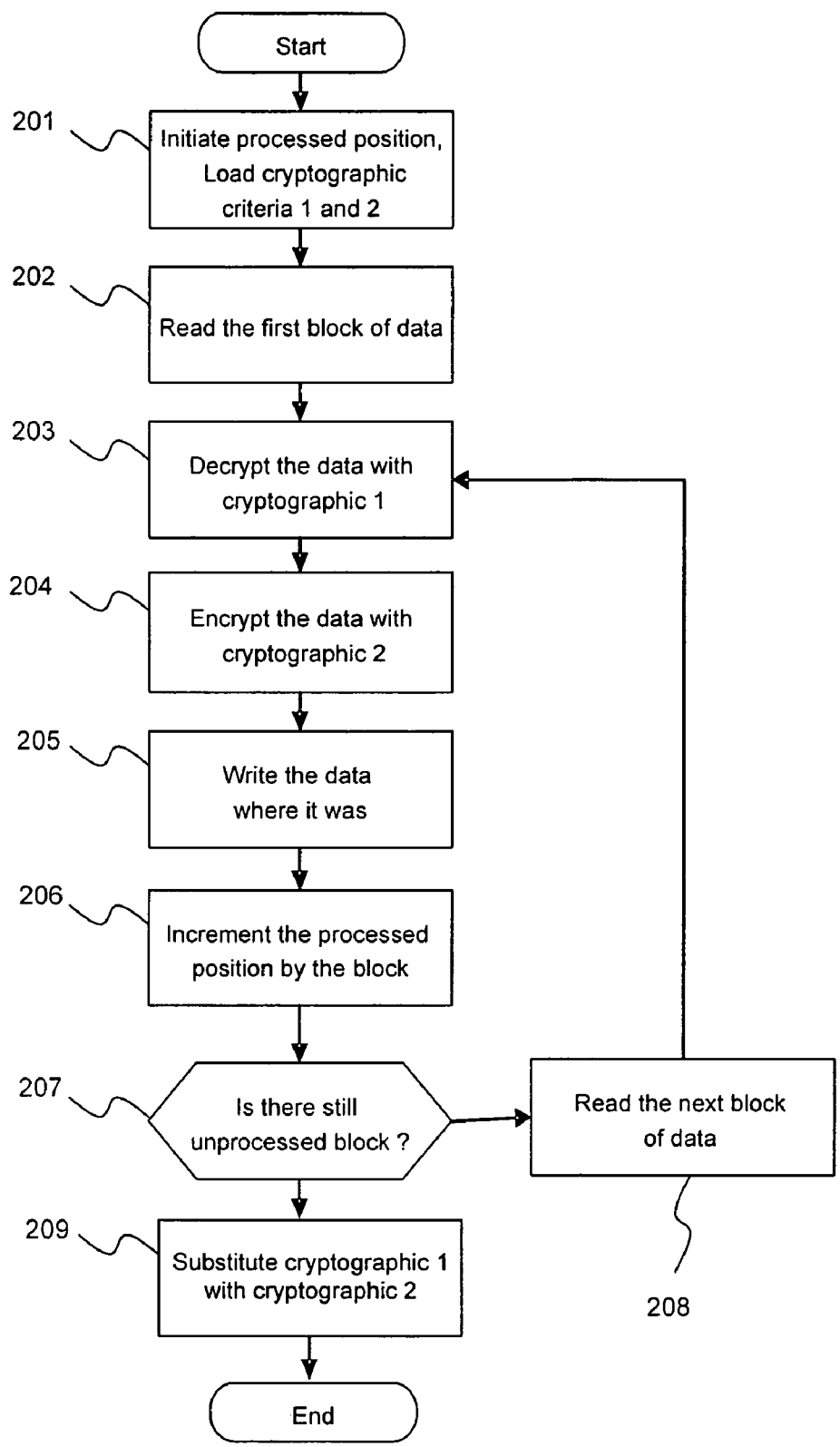
FIG. 2 is a high level flow diagram showing steps of a conversion operation according to an illustrative embodiment of the present invention.

FIG. 2 shows high level processing steps for performing a conversion process according to the present invention. Generally, the conversion process converts blocks encrypted according to the first cryptographic criteria 106 into blocks encrypted according to the second cryptographic criteria 107.

In a fist step 201, some setup processing may need to be performed. In the particular implementation described, it is assumed that the physical storage device 104 comprises plural blocks which are sequentially numbered beginning with one (e.g., block #1, FIG. 1). The conversion is performed on a block by block basis, and in sequential order beginning from block #1. Thus, a "processed position" datum or pointer 108 is provided to identify the next block of data that is to be converted, and initialized to identify block #1.

In addition, the criteria 106, 107 for encryption and decryption may require some initialization, depending on the implemented particulars. For example, up until the time for conversion, there is no need to provide the second cryptographic criteria 107. Therefore it is possible that the storages system 102 does not contain the second cryptographic criteria 107. Thus, an initializing step might entail obtaining the criteria that will be identified as the second cryptographic criteria 107. This can be accomplished by an administrator (FIG. 1) via an administration port 103a, or over a network, and so on. In the case of an encryption engine, an administrator may need to plug in or otherwise install the hardware that constitutes a new encryption engine.

In a step 202, the block location on the physical storage device 104 for the block of data that is identified by the "processed position" datum 108 is accessed. The data block is read from the physical storage device 104 at that block location. As discussed above, the data is initially encrypted according to the first criteria 106. Therefore, the data block is decrypted using the first criteria 106 to produce an un-encrypted data block, in a step 203. The second cryptographic criteria 107 are then applied, in a step 204, to the un-encrypted data block to produce a converted data block, which is now encrypted according to the second cryptographic criteria 107. The converted data block is then written back (step 205) to the block location on the physical storage device 104 from which it was initially read in step 202.

Step 205 highlights an aspect of the present invention. As will be discussed, the embodiment of the present invention shown in FIG. 1 assumes that a file system, if any, is maintained outside of the storage system. The file system provides a higher level of organization of data; e.g., the data is organized into files, directories, and so on. The file system therefore provides a mapping between a file (e.g., File-A) and the data blocks which comprise File-A, and maintains the block location information for the blocks which comprise its constituent files. Thus, in step 205, when the converted data block is written to the same location on the physical storage device 104 as its corresponding unconverted data block. This preserves the locations of the data on the physical storage device from the point of view of the file system in the host device 101. The conversion therefore transparently performed as far as the file system in the host device 101 is concerned.

Continuing with FIG. 2. the "processed position" datum 108 is incremented in a step 206 to identify the next block of data to be converted. A test in step 207 is performed to determine whether all the data blocks on the physical storage device 104 have been converted. If not, then in a step 208 the next block of data is read in a manner similar to step 202. Processing then continues from step 203, until all the blocks have been converted.

Upon completion of the conversion process, each block of data on the physical storage device 104 is encrypted according to the second cryptographic criteria 107. A replacement mechanism, whether hardware, software, or mechanical, can be provided in the storage system 102 to replace cryptographic criteria 106 with the criteria that constitute cryptographic criteria 107. For example, assume the following initial conditions wherein the first criteria 106 comprise the DES (Data Encryption Standard) using a 56-bit length key, and the second criteria 107 comprise the AES (Advanced Encryption Standard) with a 256-bit length key. Upon completion of the conversion process, the replacement mechanism will replace the first criteria 106 with the AES (Advanced Encryption Standard) with the 256-bit length key from the second criteria 107. New criteria that will be identified as the second cryptographic criteria 107 can be made known at some time prior to performing the next conversion process.

If the second cryptographic criteria 107 is characterized by having stronger encryption than the first cryptographic criteria 106, then presumably more processing capability is needed to break data that is encrypted using the second cryptographic criteria than would be needed to break data that is encrypted using the first cryptographic criteria. Consequently, the conversion process of the present invention can be used to increase the encryption strength of encrypted data stored on the storage system 102 when the technology has advanced to a point where the first encryption criteria is no longer deemed to provide adequate security against unauthorized access. For example, when it is determined that contemporary data processing capability can easily break the AES encryption in the example above, then new criteria can be defined. A longer key might be used, or a stronger algorithm might be implemented. At such time, an administrator can provide the new criteria as second cryptographic criteria 107, and initiate another conversion process. In an embodiment of the present invention which employs some form of hardware encryption engine, the new criteria might be plug-in hardware.

Another aspect of the present invention is the servicing of I/O requests during the conversion process. Thus, although blocks of data on the physical storage device 104 are in transition from one encrypted form to the other encrypted form, I/O between the storage system and host devices and other data users is available. This aspect of the present invention will now be discussed in more detail.

Figure 3:
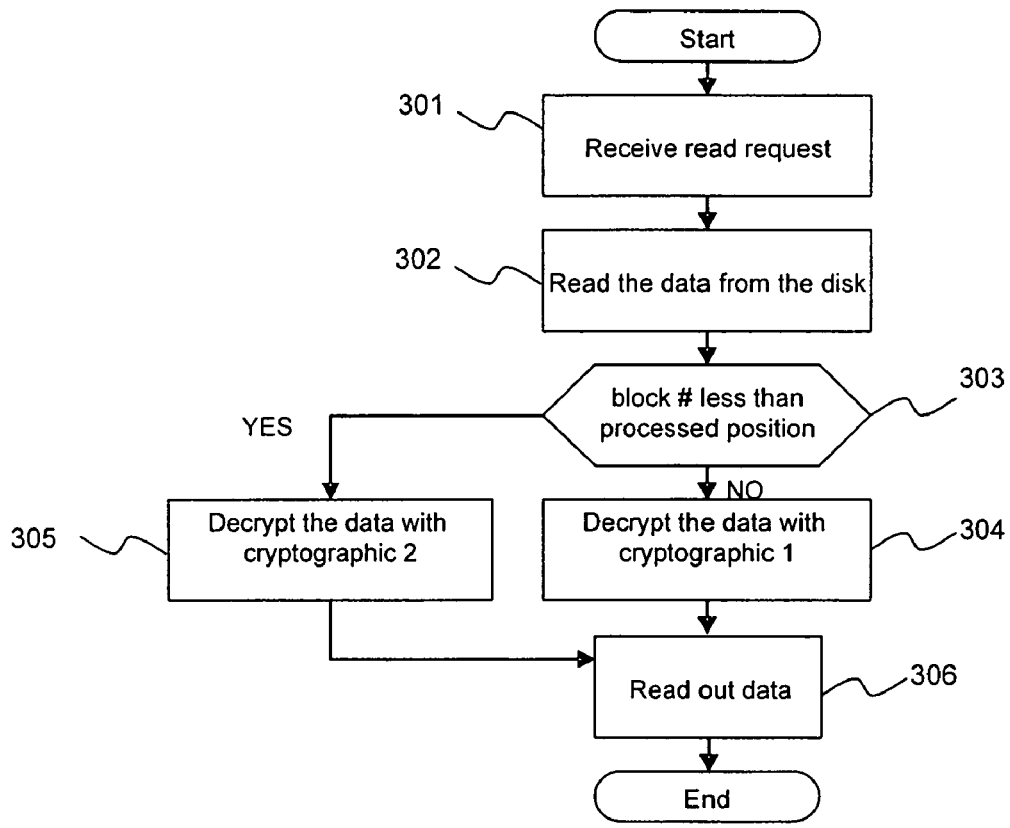
FIG. 3 is a high level flow diagram showing steps of a read operation according to an illustrative embodiment of the present invention.

FIG. 3 shows the flow for servicing a read request. As noted above, in the illustrative embodiment of the present invention shown in FIG. 1, data I/O between the host device 101 and the storage system 102 is block-level I/O. When the storage system 102 receives a read request for reading one or more blocks of data on the physical storage device 104, at a step 301, the corresponding physical storage device 104 is accessed at the block location(s) indicated in the read request to read out the data blocks (step 302).

If the conversion process is not in progress, then the accessed data blocks are decrypted using the first cryptographic criteria 106, as discussed above. If the conversion process is in progress, then in a step 303 a determination is made for each accessed data block whether that data block has been converted or not. In accordance with the implementation shown in FIG. 1, the determination can be made by comparing the block number of the accessed block against the "processed position" datum 108.

Since the blocks of data on the physical storage device 104 are sequentially numbered and the conversion process proceeds in increasing order from lowest block number, a block number that is smaller in value than the "processed position" datum 108 identifies a converted data block. Consequently, at a step 305, the second cryptographic criteria 107 are applied to such a block of data to produce a decrypted data block. Conversely, a block number that is greater than or equal to the "processed position" datum 108 identifies a data block that has not been converted. Consequently, at a step 304, the first cryptographic criteria 106 are applied to such a block of data to produce a decrypted block. Then, in a step 306, the data is read out from the decrypted data block and eventually communicated back to the host device 101 to service the read request.

Figure 4:
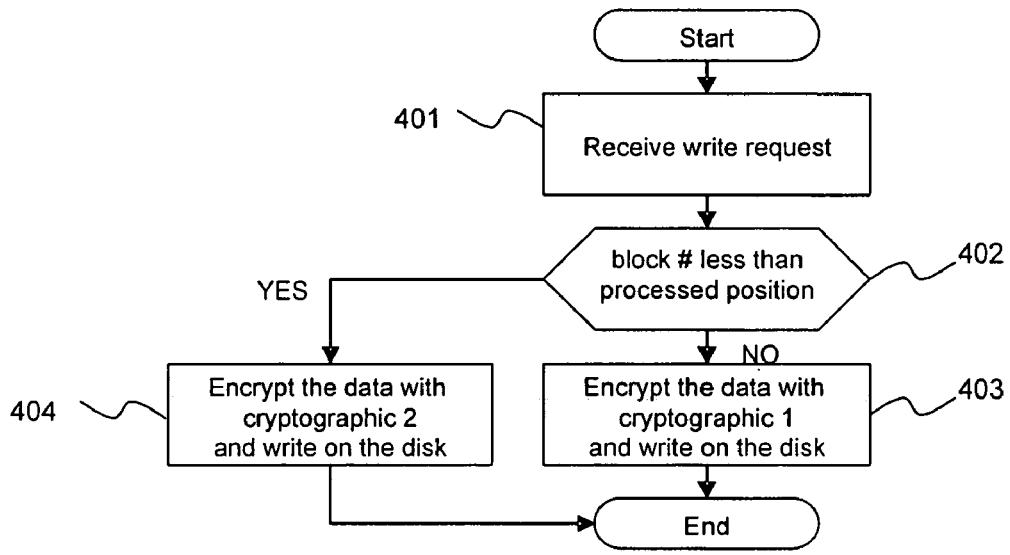
FIG. 4 is a high level flow diagram showing steps of a write operation according to an illustrative embodiment of the present invention.

FIG. 4 shows the flow for servicing a write request. A write request includes the data to be written. Since the I/O is block-level I/O, the write request specifies target block location(s) for the block(s) of data to be written.

In a step 401, the write request is received by the storage system 102. If the conversion process is not in progress, then the first cryptographic criteria 106 are applied to each block to be written to produce encrypted blocks. The encrypted blocks are then written to the block locations specified in the write request.

If the conversion process is in progress, then for each block of data to be written, a determination is made in a step 402 as to which encryption criteria to use. The target block location of the block to be written is compared with the "processed position" datum 108. If the block location is less than the datum 108, then the second criteria 107 are applied to the block to be written because the block location is in the set of data blocks that have already been converted. If the block number is greater than or equal to the datum 108, then the first criteria 106 are applied to the block to be written because the block location is in the set of data blocks that have not yet been converted. The properly encrypted data block is then written to the physical storage device 104.

As can be seen from the foregoing, the simple mechanism of the "processed position" datum 108 identifies the set of data blocks that have been converted ("converted set") and the set of data blocks that have not been converted ("unconverted set"). By determining to which set a particular accessed data block (for reading or writing) belongs, the appropriate criteria can be applied to encrypt or decrypt the data block. Those of ordinary skill will therefore realize that other techniques for tracking converted and non-converted data blocks might be more appropriate for a given physical storage scheme.

As mentioned above, conversion of encrypted data on a storage system 102 is provided to convert the stored encrypted data to be encrypted according to a new set of cryptographic criteria. In this way, stronger data encryption can be periodically applied to the data on a storage system to match improvements in data processing technology and thus maintain the data's resiliency to breaking of the encryption. In addition, the conversion is performed in an online fashion which allows the conversion to proceed on a live system. Users can thus access the encrypted storage system during the conversion process in transparent fashion. Data read from the storage system will be properly decrypted. Data written to the storage system will be properly encrypted. Processing in the storage system in accordance with the invention will ensure that the conversion goes to completion, while permitting the servicing of I/O requests.

Figure 5:
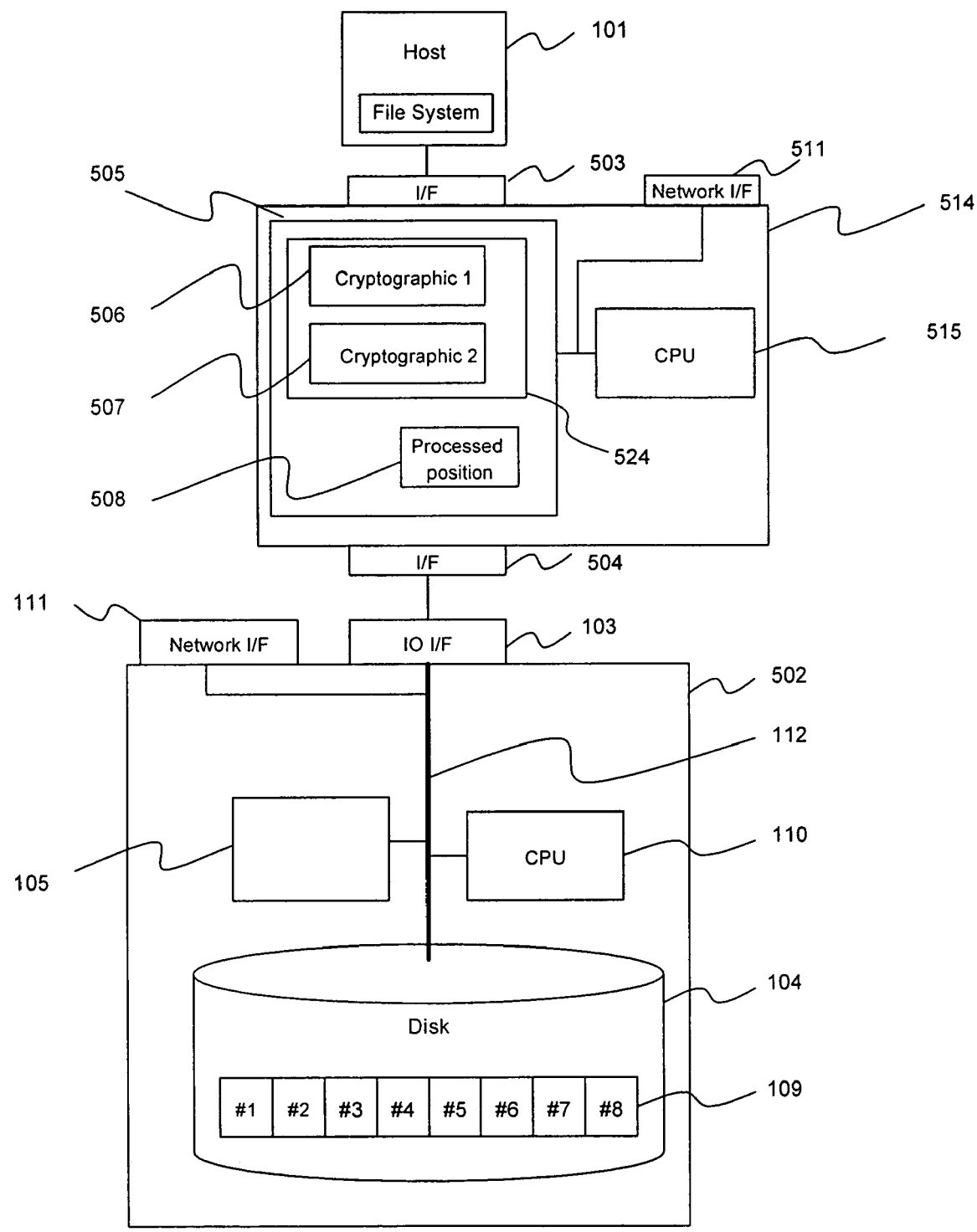
FIG. 5 is a generalized block diagram showing another embodiment of a storage system according to the present invention.

From the foregoing, it can be appreciated that various alternative embodiments are possible. For example, FIG. 5 shows a storage appliance 514 configuration in which the cryptographic component is provided outside of the storage system 502.

The storage appliance 514 includes an interface 503 for a data connection with the host device 101. An interface 504 provides a suitable data connection to a storage system 502. Hardware in the storage appliance 514 includes a processing component 515 and a memory component 505. Program code stored in the memory 505 is executed by the processing component 515 to service I/O requests received from the host device 101 by accessing the storage system 502. The program code includes a cryptographic component 524 which comprises first cryptographic criteria 506 and second cryptographic criteria 507. It can be appreciated that the cryptographic component 524 can be built around an encryption engine, such as shown in FIG. 1A. A network interface 511 can be provided to as a port through which cryptographic criteria can be obtained, much in the same way as provide by network interface 111 discussed above.

Operation of the storage appliance 514 proceeds according to the processing described in FIGS. 2–4 above. For example, the host device 101 makes block-level I/O requests to the storage appliance 514. The storage appliance in turn communicates with the storage system 504 over the data path between the interfaces 504 and 103. Conversion processing occurs as shown in FIG. 2, except that the cryptographic component 524 communicates with the physical storage device 104 by way of the interfaces 504 and 103, instead of the internal bus 112 as shown in FIG. 1. Likewise, I/O servicing during the conversion process occurs according to FIGS. 3 and 4.

According to another aspect of the present invention, the data on the storage system 102 can initially be stored in un-encrypted form. This is useful for upgrading legacy systems in which the data is not encrypted, to employ the cryptographic storage technique of the present invention. Actually, this aspect of the present invention is a special case where the first cryptographic criteria 106 is initially NULL, meaning that there are no criteria. It can be appreciated that the conversion process of FIG. 2 is applicable for the first conversion. Since the first criteria are NULL, the decryption step 203 amounts to doing nothing and is effectively skipped. Similar considerations are made if an I/O request is made during the initial conversion process. Thus, the decryption step 304 in FIG. 3 is effectively not performed if the block location of a block that is accessed in response to a read request is greater than the "processed position" datum 108. Likewise, for a write request, the encryption step 403 is effectively not performed if the block location of a block to be written is greater than the "processed position" datum 108.

The storage appliance embodiment of FIG. 5 can be used to upgrade a legacy storage system. A suitably configured storage appliance 514 can be connected between the host devices and the legacy storage system. A first-time conversion can proceed according to FIG. 2, while allowing for the servicing of I/O requests according to FIGS. 3 and 4. Upon completion of the first conversion procedure on the initially un-encrypted legacy storage system, it becomes an encrypted storage system as described above in connection with FIG. 1. The criteria used during the first conversion become the first cryptographic criteria 106.

As time passes, and the technology improves, it may be decided that new cryptographic criteria is called for to defeat the improved technology. The administrator can access the storage appliance and install new cryptographic criteria and initiate a conversion according to FIG. 2 to implement the improved cryptography. Meanwhile, host devices can continue to access data during the conversion process according to FIGS. 3 and 4.

Figure 6:
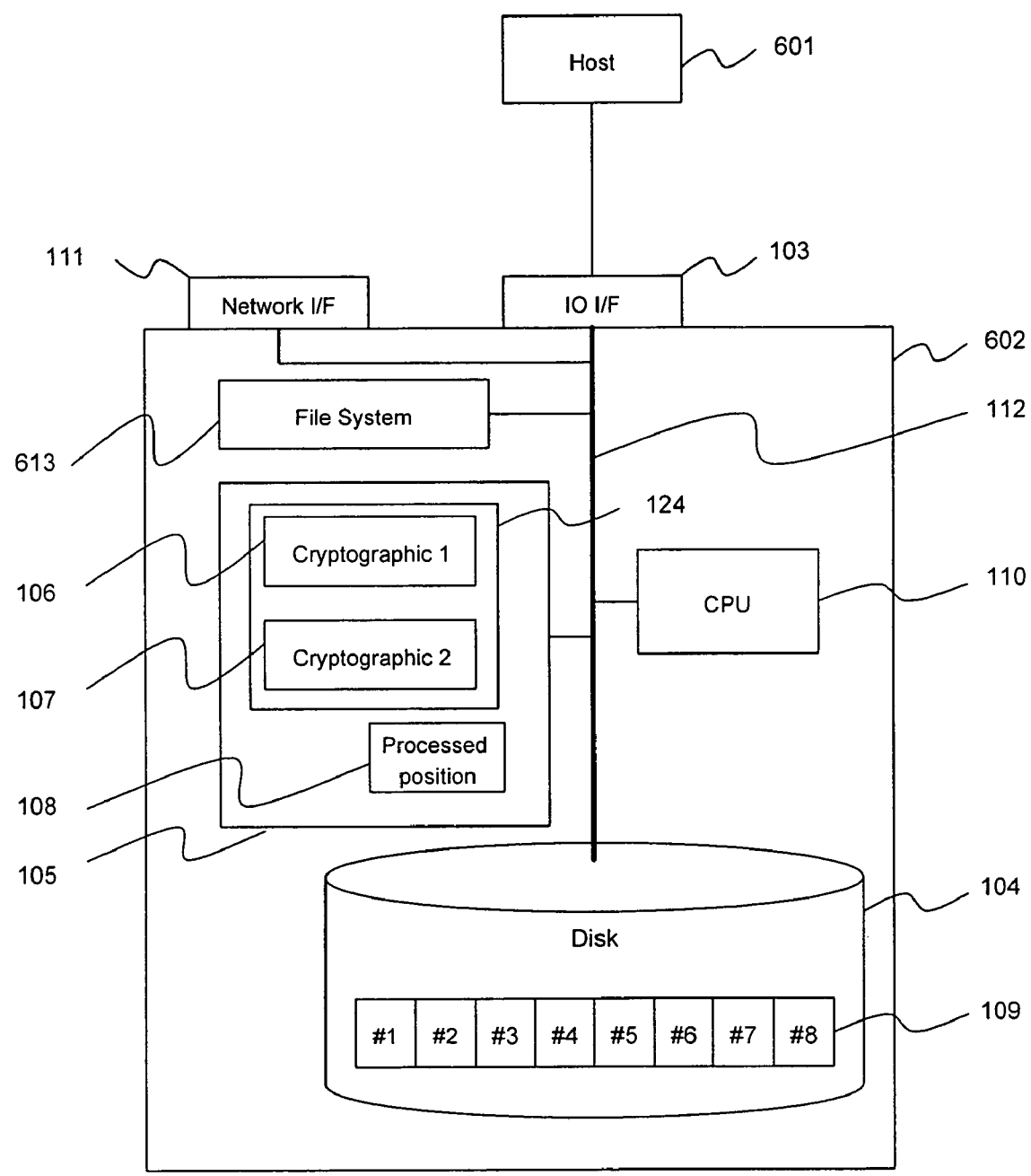
FIG. 6 is a generalized block diagram showing yet another embodiment of a storage system according to the present invention.

FIG. 6 shows yet another embodiment of the present invention. As noted above, the embodiment of the present invention shown in FIG. 1 assumes the file system, or other form of higher level data organization, is provided in the host device. In embodiment shown in FIG. 6, the file system is implemented in the storage system 602; e.g., NAS architectures are typically configured this way. The host device 601 makes file-level I/O requests to the storage system 602. The storage system 602 includes the cryptographic component 124 comprising the first and second cryptographic criteria 106, 107.

When the host device 101 requires data access (read or write) with the storage system 602, file level-requests are issued. The requests can be converted to block-level I/O operations by the storage system 602 so that the physical storage device 104 can then be accessed to service the file-level requests. Since, the file system component of the storage system 602 performs the block-level I/O to service the file-level requests, it can be appreciated that the storage system can perform the conversion process and I/O request servicing according to FIGS. 2–4 as discussed above.

In the embodiment of FIG. 6, the file system resides in the storage system 602. This presents an opportunity for a variation in the order in which the data blocks are chosen for conversion. In FIG. 2, the data blocks are chosen in increasing order from lowest block number. However, it may be desirable to convert the data blocks that belong to a specific file or set of files. In general, it may be desirable to convert a specific set of data blocks as determined by some criterion or criteria; such as for example, files of a specific type, or having a particular modification date, and so on. One of ordinary skill will realize that the selection of specific blocks of data can be identified. For example, if it is desired to convert the data blocks for a specific set of files, the blocks might be identified using a data address table which shows addresses of the data blocks of the selected files. Such a data address table is typically maintained by file system 613. The processed position datum 108 can be implemented according to the file system implementation; for example it can be a list of addresses of data blocks which have already been converted by the second cryptographic criteria. This list can then be searched in steps 303 and 402 (FIGS. 3 and 4) to determine if the block has already been converted or not in order to service and I/O request.

Figure 6A:
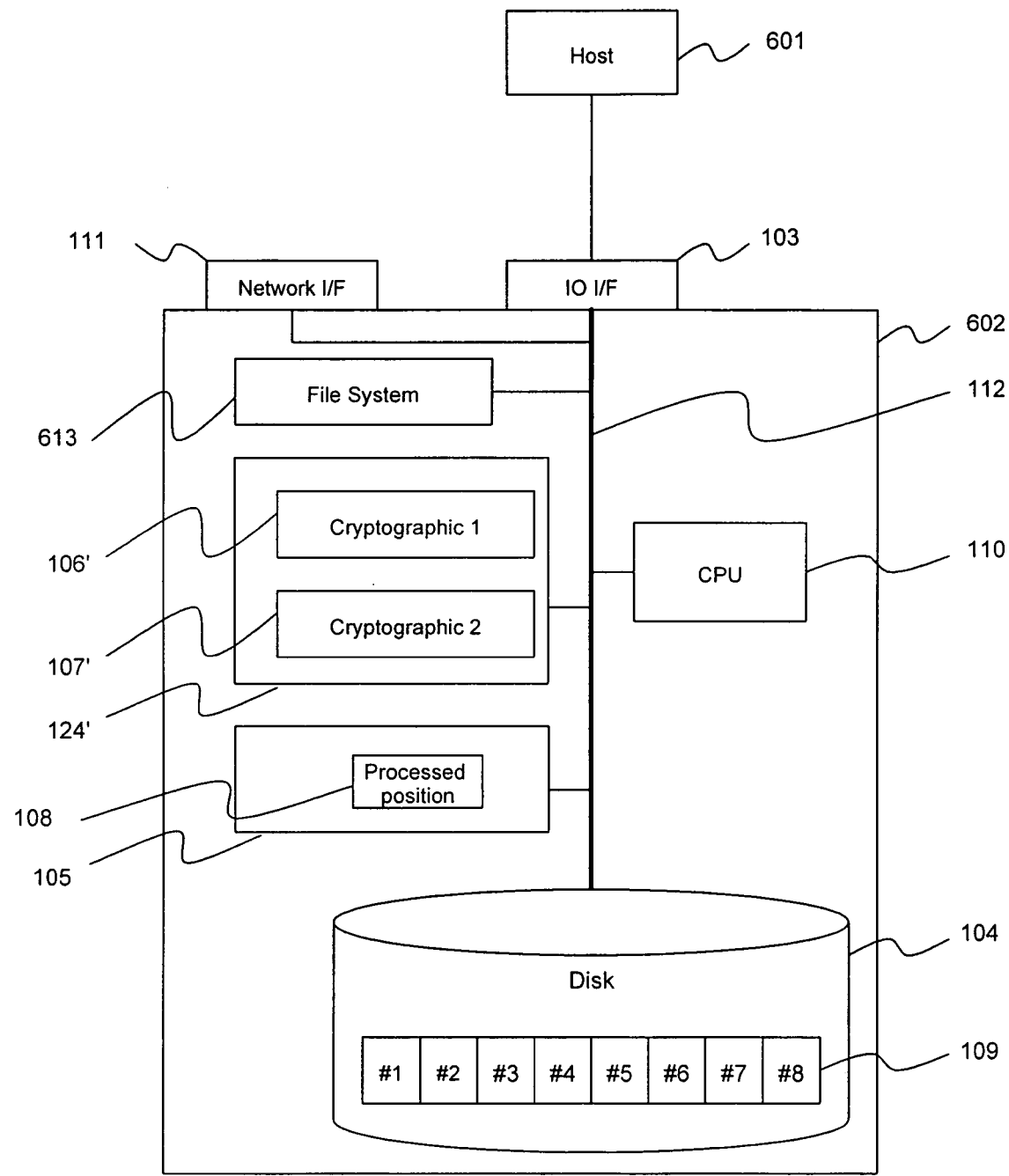
FIG. 6A shows an embodiment of FIG. 6 that uses hardware encryption.

FIG. 6A shows an embodiment similar to FIG. 1A in that the cryptographic component 124 shown in FIG. 6 is implemented as a hardware-based encryption engine 124'. As in the case of FIG. 1A, the engine can be pure logic, or the engine can be some combination of logic and firmware. For example, the engine might comprise a specialized DSP with firmware that store different algorithms.

What is claimed is:

1. A storage system including a storage device to be coupled to a host computer and an administrative device via a network, the storage system comprising:
    a first region of a storage area configured by first data blocks in the storage device, storing data in a first data form encrypted with a first cryptographic criteria to be provided from the administrative device;
    a second region of the storage area configured by second data blocks in the storage device, storing data in a second data form encrypted with a second cryptographic criteria to be provided from the administrative device; and
    a controller configured to receive a request from the administrative device and in response thereto to convert, for each first data block of the first region, the data stored in said each first data block into data of the second data form thereby producing the second data blocks of the second region;
    wherein the controller is configured to receive, concurrently with the converting, a write request including data in a third data form from the host computer, the controller further being configured to receive, concurrently with the converting, a read request from the host computer, the third data form being different from the first data form and the second data form, whereby write requests and read requests are processed independently of the converting;
    wherein, in response to the write request, the controller determines if the data of the write request are to be stored in the first region of the storage area or in the second region of the storage area, encrypts the data in the third data form from the host computer with the first cryptographic criteria when the data are to be stored in the first region of the storage area, and encrypts the data in the third data form from the host computer with the second cryptographic criteria when the data are to be stored in the second region of the storage area;
    wherein, in response to the read request, the controller reads data from the storage device and performs decryption using either the first cryptographic criteria or the second cryptographic criteria depending on whether the data is read from the first storage area or the second storage area, whereby the controller decrypts data in the first data form stored in the first region of the data blocks with the first cryptographic criteria in order to return the data in the third form to the host computer and decrypts data in the second data form stored in the second region of the storage area with the second cryptographic criteria in order to return the data in the third form to the host computer,
    whereby write requests and read requests are processed independently of the converting.

2. The storage system of claim 1, wherein the first region of the storage area and the second region of the storage area each is configured by contiguous data blocks.

3. The storage system of claim 1, wherein data stored in the first region of the storage area and the second region of the storage area are configured to be file data.

4. The storage system of claim 1, wherein the storage area is specified by the administrative device to provide the first cryptographic criteria and second cryptographic criteria and to control encryption of data stored in the storage area.

5. The storage system of claim 1, wherein the controller converts the data in the first data form to the data in the second data form to replace the first data form with the second data form after the data are stored in the first region of the data blocks.

6. The storage system of claim 5, wherein the controller decrypts the data in the first data form with the first cryptographic criteria and encrypts the decrypted data with the second cryptographic criteria to convert the data in the first data form to the data in the second data form.

7. The storage system of claim 5, wherein a third cryptographic criteria is provided from the administrative device to convert the data in the second data form to data in a data form encrypted with the third cryptographic criteria.

8. The storage system of claim 1, wherein the third data form is un-encrypted form.

* * * * *